July 26, 1927.

E. MELBERG 1,636,824

FASTENER

Filed Aug. 23, 1926

Inventor
Ernest Melberg
By J. M. St. John
Attorney

Patented July 26, 1927.

1,636,824

UNITED STATES PATENT OFFICE.

ERNEST MELBERG, OF NORWAY, IOWA.

FASTENER.

Application filed August 23, 1926. Serial No. 130,979.

This invention relates to fasteners for connecting two or more plates, and is more specifically designed for attaching to their mounts the license plates of automobiles.

The object of the invention is to produce a simple and inexpensive fastener, by means of which a license-plate may be attached to an automobile securely and permanently, and without the use of any tool whatever.

The invention is fully disclosed in the description and claim following, reference being had to the accompanying drawing, in which:—

Figure 1:
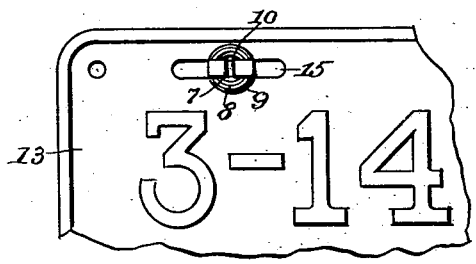
Figure 2:
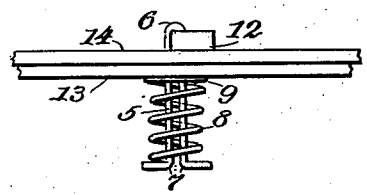
Figure 3:
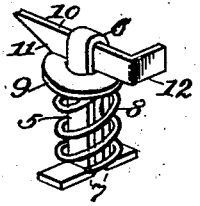

Fig. 1 is a front view of a fastener embodying my invention as applied to a fragment of a license-plate. Fig. 2 is a plan view of the same. Fig. 3 shows in perspective the fastener detached.

A strip of sheet metal or a flat wire 5 is looped at 6, and its parallel legs are bent outwardly at 7 to form a T head. Over the doubled body so formed is placed a compression coil spring 8, and preferably a washer 9, though the washer is not always indispensable. A key 10 slipped through the loop and over the washer (or spring) holds all the parts in connection, when not in use. For convenience in inserting the key it is tapered at 11, and for convenience in both inserting and withdrawing it, a head 12 is provided, by a simple bend, as shown.

In fastening a license-plate 13 to its supporting member or mount 14, the spring may be in front, or behind, as preferred. It is herein shown in front, in which case the washer is set next the slot 15 in the plate, with the spring between it and the head of the fastener. The looped end of the fastener being pushed through the slot and the hole in the mount, the key is slid through the loop and across the hole, where it will remain indefinitely under the constant tension of the spring. If the spring is used behind the mount, to give a little neater appearance to the front of the license-plate, a washer should preferably be used between the head of the fastener and the slot in the plate, for obvious reasons.

It will be evident that the fastener may be attached in a moment, and with no tool whatever. The spring pressure holds the parts securely in position, and binds the plate to the mount so firmly that any rattle of the parts is prevented.

Having thus described my invention, I claim:—

A fastener of the class specified, comprising a looped body having substantially parallel sides turned outwardly at the ends to form a head, the diverging parts being adapted to span a coil spring surrounding the body, a coil spring mounted on the body, and a flat key, mainly straight-sided, but beveled at the end and having a laterally turned head, the key being insertable in the loop and adapted to hold a fastened part between it and the head of the fastener.

In testimony whereof I affix my signature.

ERNEST MELBERG.